United States Patent [19]

Ruder

[11] 4,110,914

[45] Sep. 5, 1978

[54] HAND COMPASSES

[75] Inventor: Nils Ruder, Fareham Hants, England

[73] Assignee: Normark Corporation, Minneapolis, Minn.

[21] Appl. No.: 774,864

[22] Filed: Mar. 7, 1977

Related U.S. Application Data

[63] Continuation of Ser. No. 643,009, Dec. 22, 1975, abandoned.

[51] Int. Cl.² .................. G01C 17/06; G01C 17/08
[52] U.S. Cl. .................................. 33/355 D; 33/364
[58] Field of Search ............... 33/355 R, 355 D, 356, 33/364

[56] References Cited

U.S. PATENT DOCUMENTS

| 1,533,683 | 4/1925 | Abbot | 33/364 |
| 2,446,258 | 8/1948 | Burt | 33/355 D |

FOREIGN PATENT DOCUMENTS

| 419,635 | 4/1947 | Italy | 33/364 |
| 267,869 | 9/1929 | Italy | 33/355 D |
| 161,478 | 11/1957 | Sweden | 33/355 D |
| 3,644 of | 1813 | United Kingdom | 33/364 |
| 1,302,448 | 1/1973 | United Kingdom | 33/356 |

Primary Examiner—Richard R. Stearns
Attorney, Agent, or Firm—James R. Cwayna

[57] ABSTRACT

A compass design particularly for wrist mounted and hand held compasses which includes a first exterior, fluid tight case having a pair of pivot members respectively on the upper and lower surfaces thereof for rotatably mounting a second interior case member which second case member is provided with a horizontally pivotal magnet body which magnet body is permitted to move a predetermined degree with respect to a normal horizontal position to accommodate for magnetic inclination and which outer case is filled with liquid to place the inner case in substantial equilibrium between the pivot members such that the inner magnet bearing case will be substantially frictionally free to rotate in the outer case.

The mounting for the magnet body within the inner case allows the magnet body to oscillate and therefore provide free movement even though the magnet is not held in a horizontal position.

4 Claims, 5 Drawing Figures

HAND COMPASSES

BACKGROUND AND OBJECTS OF THE INVENTION

This application is a continuation application of application Ser. No. 643,009, now abandoned, filed Dec. 12, 1975 and entitled Improvements in Hand Compasses and contains subject matter only as disclosed therein.

FIELD OF THE INVENTION

This invention relates generally to compasses and more particularly to hand held or wrist mounted, personal compasses.

In the past, various compasses have been provided for personal use and normally these compasses include a floating dial wherein a single pivotal connection is provided for the dial and for proper operation thereof, the compass should normally be held in a substantially horizontal position. If the same is not held in this position, the dial will tend to, through magnetic inclination, lock against the face of the compass to prevent movement thereof. These singular bearing dials also are what may be termed non-campening compasses in that the indicator dial will oscillate relatively rapidly before settling down to a direction detection situation.

It is applicant's concept to provide a compass for hand use or wrist mounted useage which will provide a relatively wide range of non-locking movement which includes the consideration of magnetic inclination and which further includes a campening arrangement such that the reading dial will settle to the direction finding situation relatively quickly.

It is a further object of applicant's invention to provide an improvement in hand held or wrist mounted compasses which includes a means for providing an exterior case configuration having a pair of trunions or pivots mounted generally vertically therein and having an exterior magnet housing mounted for rotation with respect to said trunions and having a magnet body mounted within the interior housing of the unit.

It is still a further object of applicant's invention to provide a compass device including an exterior case member which may be fluidly sealed and having an inner magnet housing mounted for rotation therein with a magnet body mounted for oscillation within said inner case wherein the inner magnet body is free to oscillate through a predetermined distance.

It is yet a further object of applicant's invention to provide an improvement in wrist mounted or hand held compasses which includes an outer case and an inner case which inner case is mounted for rotation within the outer case and wherein an equilibrium substance is provided within the outer case and surrounding the inner case for substantial floatation of the inner case within the outer case such that a minimal or no-load situation will result on bearings between the inner and outer case.

These and other objects and advantages of the invention will more fully appear from the following description made in connection with the accompanying drawings in which the same numeral is used to designate the same or similar parts throughout the several views, and in which.

Figure 1:
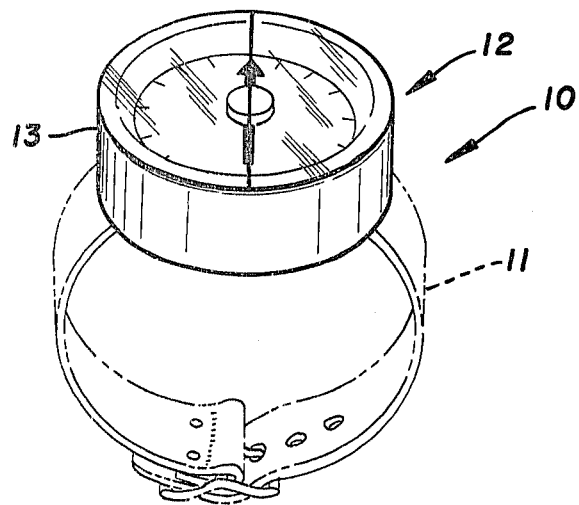
FIG. 1 is a perspective view of a compass embodying the concepts of applicant's invention.
Figure 2:
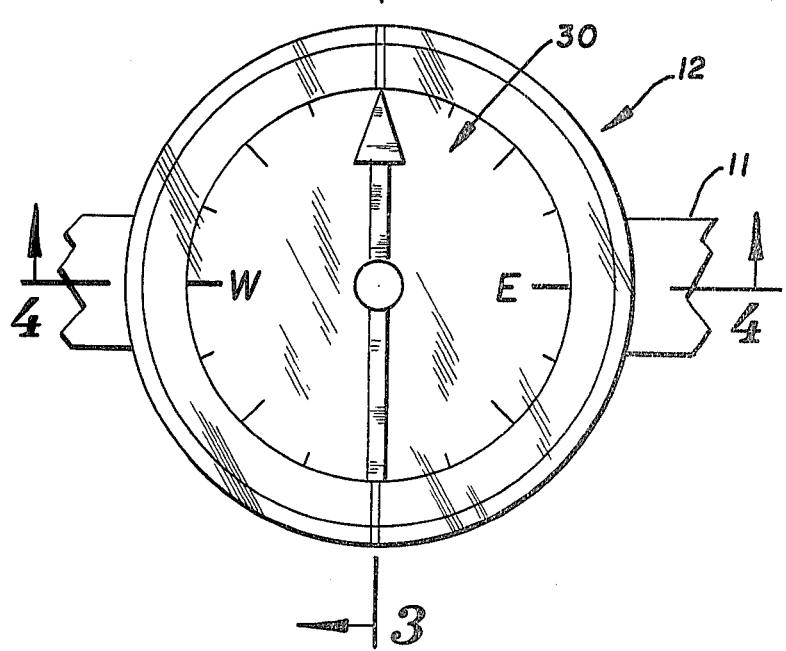
FIG. 2 is a top plan view of the compass illustrated in FIG. 1.

In accordance with the accompanying drawings, applicant's compass is generally designated 10 and includes, in the form shown in FIG. 1, a wrist mounting strip 11 and the compass body 12.

The wrist strap 11 is commonly known in the art and simply provides means for mounting the unit to a person for his convenience.

Figure 3:
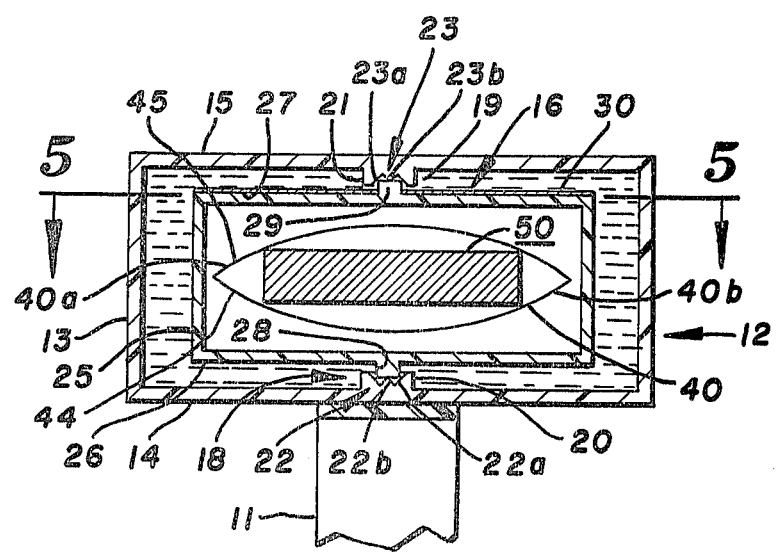
FIG. 3 is a vertical section taken substantiallly along Line 3—3 of FIG. 2.
Figure 4:
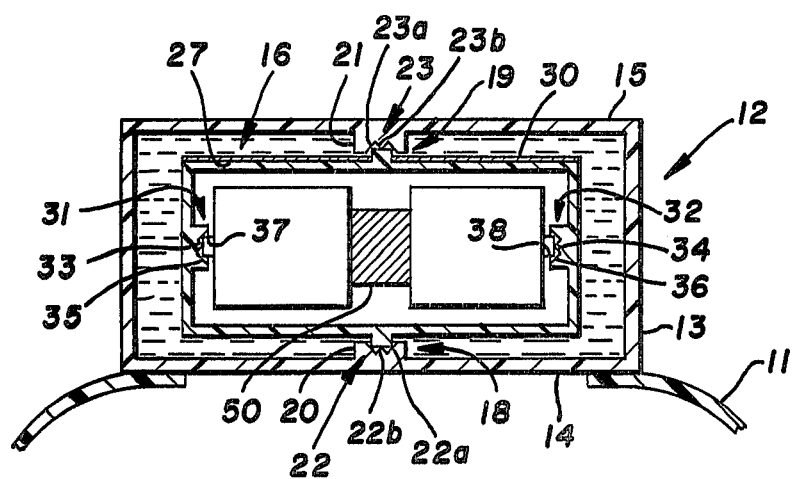
FIG. 4 is a vertical section taken substantially along Line 4—4 of FIG. 2.
Figure 5:
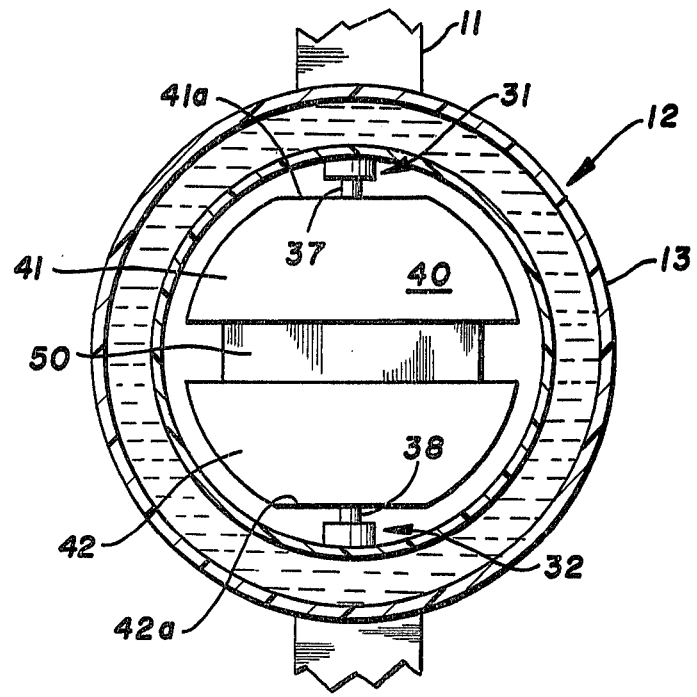
FIG. 5 is a horizontal section taken substantially along Line 5—5 of FIG. 3.

The compass body 12 is best illustrated in the cross sections of FIGS. 3, 4 and the section of FIG. 5. As illustrated herein, the body 12 includes a generally cylindrical structure 13 having a bottom 14 formed therewith and secured thereto and having an attachable upper surface 15 to provide a substantially closable housing. Obviously, in order to assemble the compass, this top surface 15 is attachable to the lower structure consisting of side 13 and bottom 14 after the inner magnet housing 16 is place therein.

As illustrated in these views, the lower surface 14 and the upper surface 15 of the body 12 include a pair of bearing members designated respectively 18, 19. In the form shown, these bearing members include a pair of inwardly directed locating elements 20, 21 of a predetermined height and having formed therein a substantially W-shaped configuration 22, 23. This W-shaped configuration includes downwardly and inwardly extending side elements 22a, 23a and an inwardly directed, generally conical shaped mounting element 22b, 23b. This W-shaped element then will provide a point contact arrangement at the tip of the concially shaped, inwardly directed element 22b, 23b with side or edge contacting elements provided by the exterior wings 22a, 23a of the outwardly directed sides of the W element.

Contained within this bearing structure consisting of the lower bearing element 18 and the upper bearing element 19 is the magnet housing body 16.

As illustrated, in the form shown, this inner housing 16 consists of a generally cylindrical side element 25, a lower surface 26 and integrally formed with the side, and an upper sealable surface 27 which is attachable to the upstanding ends of the cylindrical side element 25. Arranged on both the upper and lower surfaces 26, 27 and extending outwardly thereof and arranged generally centrally thereof are pivot members 28, 29 which are receivable into the bearing members 18, 19 of the lower and upper surfaces of the exterior case unit 12. Obviously, the size of these outwardly extending members 28, 29 is selected such that they will contact the ultimate concial tips 22b, 23b of bearings 18, 19 and their outer diameters will also contact the sides 22a, 23a of the bearings 18, 19. With this simple construction, it should be obvious that a two bearing surface is provided for the interior magnet housing body 16 but an additional feature of this situation should be considered. Obviously, the inner housing 16, is of a certain weight and the applicant has provided herein that the two cases 16 and 12 be fluidly sealed and that fluid be inserted into the exterior housing 12 such that the inner magnet housing 16 is in substantial equilibrium and that a minimal amount of weight thereof is carried upon the bearing surfaces and particularly upon the bottom bearing 18 of the unit. Obviously, by filling the unit with a non-freezing liquid, the interior casing 16 will substantially float and the non-freezing characteristic of the fluid with which the unit is filled will insure this floatation through a high range of temperatures.

Arranged on the upper surface 27 of the inner casing 16 is a dial indicator generally designated 30. This dial indicator will be provided with indicia to indicate the normal compass directions and the upper surface thereof will be visible through the upper surface of the exterior casing. Although not illustrated in this particular drawing, it should be obvious that this same indicator 30 could be arranged on the lower surface 26 of the inner housing 16 to permit the compass to be read in an inverted position.

The inner housing unit 16 is provided with diametrically opposed bearing members designated 31, 32 which bearing members agains include a radially, inwardly directed structure having a substantially W-shaped configuration formed interiorly thereof which W-shaped unit includes a conical pivot 33, 34 bounded by inwardly directed diverging side elements 35, 36 such that an extending trunion or pivot member 37, 38 of the magnet body may be mounted therein with again, minimal frictional contact between the trunion member 37, 38 and the bearing constructions 31, 32.

The magnet body generally designated 40, in the form shown, consists of a truncated circular assembly having side elements 41, 42 with flat radial positions 41a, 42a arranged on the sides thereof, which sides obviously must agree with the location of the aforementioned trunion members 37, 38. Arranged between said side elements 41, 42 is a polarized magnet 50 and the same is positiively adhered to these side elements 41, 42 for oscillation therewith between the bearings 31, 32. As illustrated herein, magnet 50 is of substantially rectangular confiuration and obviously it is necessary that the indicator dial 30 be correlated to the magnetism of this magnet body section 40. As illustrated in FIG. 3, the particular location of the bearing members 31, 32 and the associated trunions 37, 38 of the magnet body 40 permit the magnet body 40 to oscillate a certain degree before possibly contacting the lower 26 and upper 27 surfaces of the interior magnet housing 16. The oscillation of the magnet body 40 and the magnet 50 contained therein is permitted through the particular cross-sectional shape of the generally circular body 40. This shape is particularly illustrated in FIG. 3 wherein the magnet housing unit 40 is defined as a substantially oblate spheroid with defined surfaces 44, 45 which will permit the ultimate ends 40a, 40b and their joining and conformed sides to oscillate within the bearings 31, 32 and trunion construction 37, 38 within the confines of the inner housing 16 at least through a predetermined angular configuration. Obviously, if this inner body were of a generally cylindrical configuration, the ends 40a, 40b of the unit would abut with the inner surfaces of this inner housing and such rotation would be greatly limited.

The use of such compasses is generally well known in the art, but applicant's compass provides structures that are uncommon to hand held or wrist mounted compasses. The dual bearing configuration of the outer case with respect to the inner case allows for a generally free floating situation for the inner case particularly when the same is combined with the fluid filled situation between the inner and outer case. This fluid filling not only provides a certain equilibrium between the inner and outer case but also provides a dampending effect to relative movement of the inner housing 16 with respect to the outer housing 12. The magnet body as illustrated herein, combines a dual pivotal mounting situation and the inner magnet body will not only cause the inner case housing 16 to rotate to its final direction determination, but will also permit the magnet position to compensate for at least a degree of magnetic inclination. Even if the magnet body 40 is brought to its extreme position through magnetic inclination, it will not shift the inner casing 16 into a locking position with the outer casing and thereby stop the operation of the magnet.

It should be obvious that with applicant's device, the entire unit of this compass may be made from a relatively inexpensive material which still affords bearing surfaces as required to provide a substantially friction free and equilibrium type unit.

What I claim is:

1. An improvement in the structure of hand held compasses, including:
   a. a first outer housing providing an upper and a lower surface and sides between said surfaces to provide an enclosed cavity;
   b. bearing members provided in aligned relation respectively on each of said upper and lower surfaces of said outer housing and being inwardly directed;
   c. a second, inner housing having an upper and a lower surface and sides between said surfaces to provide an enclosed cavity;
   d. aligned pivot members extending outwardly from said upper and lower surfaces of said inner housing and engaging said bearing members of said outer housing to permit rotation of said inner housing in a first plane within said outer housing;
   e. said side surfaces of said inner housing including a pair of diametrically opposed aligned bearing members directed inwardly into said cavity;
   f. a magnet body having diametrically opposed pivot members arranged to engage said bearing members of said inner housing and arranged within said inner housing and moveable therein in a plane normal to the plane of rotation of said inner housing; and,
   g. said magnet body including a generally circular body portion having diametrically opposed flat portions on the circumference thereof respectively adjacent the magnet body pivot members and a cross section defining a substantially oblate spheroid, said magnet member being generally rectangular and being positioned generally centrally of said body and arranged generally normal to the diametrically opposed pivot members.

2. The structure set forth in claim 1 and said sides of said outer housing providing a cylinder extending between said upper and lower surfaces, said surfaces respectively joinable to the ends of said cylinder to provide a fluid tight housing.

3. The structure set forth in claim 2 and said outer housing being filled with a fluid.

4. The structure set forth in claim 3 and a compass rose carried by the top surface of said inner housing, said upper surface of said outer housing being transparent to allow viewing of said compass rose therethrough.

* * * * *